J. MERRITT.
PROCESS OF MAKING GASKETS.
APPLICATION FILED MAR. 20, 1906. RENEWED JUNE 5, 1912.
1,049,255.
Patented Dec. 31, 1912.
2 SHEETS—SHEET 2.
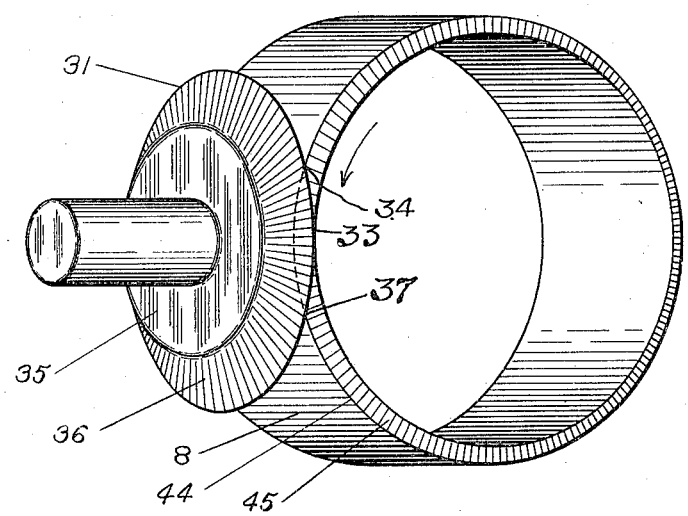
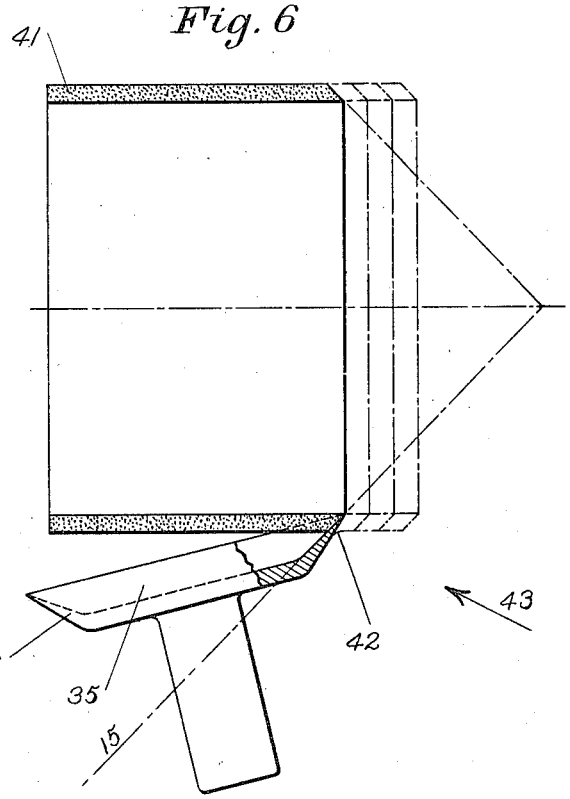
Witnesses:
H. Mallner
Janette L. Ellsworth
Inventor
Joseph Merritt
By W H Honiss, Atty.

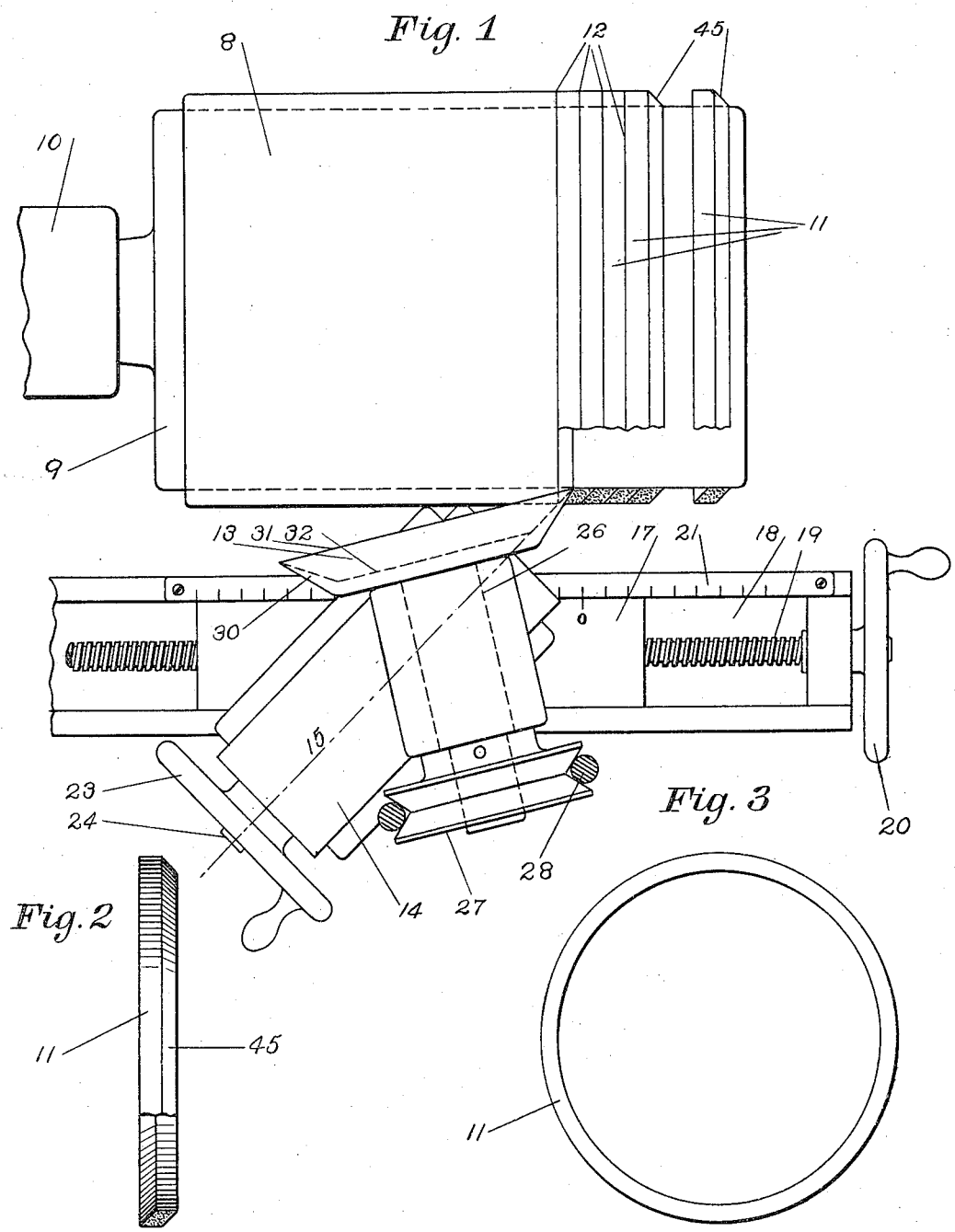

UNITED STATES PATENT OFFICE.

JOSEPH MERRITT, OF HARTFORD, CONNECTICUT, ASSIGNOR, BY DIRECT AND MESNE ASSIGNMENTS, OF ONE-FOURTH TO WILLIAM A. LORENZ AND ONE-FOURTH TO WILLIAM H. HONISS, OF HARTFORD, CONNECTICUT, AND ONE-HALF TO BEECH-NUT PACKING COMPANY, OF CANAJOHARIE, NEW YORK, A CORPORATION OF NEW YORK.

PROCESS OF MAKING GASKETS.

1,049,255. Specification of Letters Patent. Patented Dec. 31, 1912.

Application filed March 20, 1906, Serial No. 307,005. Renewed June 5, 1912. Serial No. 701,913.

*To all whom it may concern:*

Be it known that I, JOSEPH MERRITT, a citizen of the United States, and a resident of Hartford, in the county of Hartford and State of Connecticut, have invented certain new and useful Improvements in Processes of Making Gaskets, of which the following is a full, clear, and exact specification.

This invention comprises an improved method or process of manufacturing rings having inclined or conical faces.

It is herein shown and described as employed for the making of oblique angled gaskets like those shown, described and claimed in U. S. Patent No. 826,104, granted July 17, 1906, to William H. Honiss.

In illustration of this process I have shown in the accompanying drawings one of the forms of apparatus which has been devised for carrying out this process, the said apparatus being shown, described and claimed in my divisional application Serial No. 372,062, filed May 6, 1907, which is a division of the present application.

Figure 1 of the drawings is a plan view representing the said apparatus illustrative of this process; Fig. 2 is a plan view partly in section; and Fig. 3 is an end view illustrating the type of gasket made by the apparatus as shown in Fig. 1. Fig. 4 is an isometric view illustrating the rotary cutter preferably employed for this process and showing its relation to the tube from which the gaskets are severed by the cutter. Figs. 5 and 6 are plan views, illustrating some of the differences in form, diameter and relative position of the cutter required to adapt it to the cutting of angular gaskets of different diameters.

The particular gaskets referred to and herein shown in Figs. 2 and 3 are intended for use in closures employed for the hermetic sealing of cans, jars and similar receptacles.

One of the recognized advantages in this form of gasket, in addition to its ultimate utility in the closure itself, is that its form enables it to be manufactured without waste from a tube of rubber or other suitable gasket material by severing the gaskets successively from the end of a tube, as shown in the aforesaid applications, by means of a circumferential cut penetrating the wall of the tube at an acute angle to the longitudinal center of the tube. It is desirable to make the separating cuts so as to leave both the cut surfaces uniformly smooth, in view of their subsequent use in the making of air tight joints. The known processes, tools and apparatus are unsuited for the manufacture of these gaskets, and particularly to make them with sufficient smoothness and rapidity for practical and commercial purposes. This is largely due to the fact that known tools and processes are not adapted to the making of the peculiar conical cut through the annular wall of the tube, and extending that cut smoothly around the circumference of the tube, since the tools themselves do not conform to the conical contour of such a cut, and hence do not clear the cut surfaces properly, but are liable to scrape or score those surfaces. In the present invention these difficulties are overcome by parting the gasket from the tube along a circumferential path or zone of cleavage that approximately conforms to the conical surfaces separated by the cut. The preferred instrumentality employed is a cutter having a conical cutting blade which penetrates the wall of the tube in approximate conformity with the conical surface of the angular side of the gasket. This cutter is supported at the side of the tube and is moved back and forth in a line which carries the cutting edge through the wall of the tube at the proper angle, the tube or the cutter being advanced in the direction of the length of the tube, at the intervals between the cuts, so as to make the gaskets of the desired length. This conical or dished cutter, and the tube of gasket material may be mounted and manipulated in various ways in conformity with this process to penetrate the wall of the tube at the desired angle; and to extend the cut at that angle circumferentially around the tube. For example, the tube may be supported for rotation, and the non-rotating cutter supported for movement in a path which carries it through the wall of the rotating tube at the proper angle, and at the desired intervals. Or the tube may be supported without rotation, and the cutter be mounted for rotation in an arm which revolves the cutter around the tube, the cutter being moved inwardly toward its center of revolution, so as to have its cutting edge penetrate the wall of the tube at the required angle. But I prefer to carry out this process with the apparatus arranged as shown in Fig. 1, in which the tube 8 is mounted on a mandrel 9, and that mandrel is supported for rotation in any convenient way, as upon a spindle 10; and the gaskets 11 are successively separated from the tube by the successive cuts 12 made by the cutter 13, which is mounted for rotation in a cutter slide 14, the latter being mounted for sliding movement in a direction parallel with the line 15 of the angular cut. The slide 14 is mounted upon a carriage 17, which is mounted for longitudinal movement on a bed 18, in a direction parallel with the longitudinal center of the tube, being moved in that direction during the intervals between the cuts, in any convenient way, as by means of the feed screw 19. That feed screw may be turned automatically to the extent required to feed the cutter from one cutting position to another. In the present instance, however, it is shown to be provided with a handwheel 20, by means of which the screw may be manually turned, the extent of movement being indicated by the zero mark upon the carriage 17, in connection with the graduations of the scale 21, which scale may be removed and replaced by other scales suited to the different lengths of the gaskets required.

The cutter slide 14 may be moved back and forth to carry the edge of the cutter through the wall of the tube in any convenient way, as by a hand lever, or as herein shown, by means of a handwheel 23, and screw 24. When thus mounted and operated, the cutter 13 is preferably provided with a central shank or stem 26, which is journaled in the slide 14, and has fixed upon its outward end the pulley 27, driven by the belt 28 from any convenient shaft or motor.

The flaring portion 30 of the cutter adjacent to the cutting edge 31 of the blade may extend directly to the central stem of the cutter, especially where the cutters are of small diameter. But for convenience in the manufacture and sharpening of these cutters, the annular flaring portion is made comparatively shallow, joining with the stem by means of a flat web 32.

The diameter of the cutter and the angle of the flare are the two factors which determine its adaptability for coinciding with the circumferential cuts by which the gaskets are separated; and these factors are in turn determined by the diameter of the tube and by the angle at which the severing cut is made. This is best illustrated in Figs. 5 and 6, which show the proportions and positions of two cutters suitable for cutting gaskets of different diameters, each at an angle of 45 degrees. The diameter of the tube shown in Fig. 6 is considerably larger than that shown in Fig. 5; and although the angle of the cut, relative to the axial center of the tube, is the same in both cases, it will be seen that the larger tube 41 may use a larger cutter 35, the cutting blade 36 of which is flared outwardly at a greater angle from the axis of the cutter than is the blade 38 of the smaller cutter 39 employed for the smaller tube 40 so as to conform to the larger cone of the larger tube. In this case also the axis of the cutter is disposed at a greater angle to the axis of the tube. These diameters and angles are easily ascertained by experiment. In setting these cutters, it is considered advisable to set the inner surface of the flaring blade in coincidence with the line 15 of the cut, as shown in the figures, since this inner surface of the blades comes in contact with the remaining uncut and therefore less flexible portion of the tube; whereas the acute angled edges of the gaskets, being freed from the tube, and therefore more flexible, will readily pass over the outer beveled surface of the cutting blade, as illustrated at 42 in Fig. 6. The extent to which the cutting edges of these circular cutters penetrate and interlap with the cut surface of the gasket is best shown in Fig. 4, which is an isometric view taken substantially at right angles to the angle of the cut, as represented by the arrow 43 in Fig. 6. The numeral 31 represents the cutting edge of the cutter; while the numeral 44 indicates the external diameter of the tube; and the area included within the overlapping portions of these circles designates the area over which the cutter must be in substantial conformity to the beveled end 45 of the tube, in order to cut the walls through cleanly and avoid scoring or scraping the cut surfaces.

Obviously, the tube or the cutter, or both, may rotate in either direction. Assuming, however, that the tube rotates in the direction of the arrow shown adjacent thereto in Fig. 4, the cutting action devolves upon some or all of that portion of the cutting edge 31 of the cutter which is between the deepest portion 33 of the cut and the point 34, which is the point at which the cutter enters into or emerges from the tube, according to the direction of rotation of the cutter. Hence in this case any portion of the edge 31 which is between the points 33 and 34 of the tube is liable to be involved in the cutting operation, according to the relative speeds of rotation and the feeding action. In any case, however, it will be seen that the curved contour of the cutting blade from the point 34 to the point 37 quite closely conforms to the conical zone of cleavage between the cut off ring and the tube from which it is severed, corresponding with the conical or beveled annulus 45 described by the cut surface. This conformity not only enables the blade to cut both of these surfaces cleanly, but also enables the blade to clear those surfaces after they are cut, without scraping or recutting them. The peculiar curved obliquity of the cutting action between the points 33 and 34 also enables the cut to be made with a drawing action, which is particularly desirable for smoothness and accuracy of cutting; and to avoid stretching or otherwise deforming or displacing the material which lies at and in advance of the cutting action. This drawing action takes place not only when using a rotary disk cutter, like those illustrated in the drawings, but it also takes place in cases where a non-rotating, curved or circular blade is employed in connection with a rotating tube, even though the segment or length of blade employed should be only equal to or slightly greater than the length from 33 to 34. According to present experience, however, it appears preferable to rotate the tube and to employ a circular disk cutter, rotating at a much greater speed. This process or method of penetrating the wall of the tube by a cutting action extending obliquely with relation both to the center line of the tube and to the circumferential extension of the cut surface, enables this heretofore very difficult operation to be easily and quickly performed by means of very simple apparatus.

I claim as my invention:—

1. The process of making circumferential cuts through the wall of a tube at an acute angle with the longitudinal center line of the tube, which consists in penetrating the wall of the tube with a cutting action extending into the wall obliquely, both to the said center line and to the circumferential extension of the cut surface.

2. The process of cutting the wall of a tube in the contour of a cone substantially concentric with the longitudinal center line of the tube, which consists in penetrating the wall of the tube by a cut of circular contour, which extends into the wall of the tube obliquely, relatively to the said center line and to the circumferential extension of the cut surface.

3. The process of making acute angled ring gaskets, which consists in separating the gaskets from a tube of gasket material by means of a cut describing the arc of a circle, penetrating the wall of the tube and extending outwardly and also circumferentially, the curved contour of the cut extending obliquely along the conical course of cleavage between the gasket and the tube.

4. The process of cutting the wall of a tube in the contour of a cone substantially concentric with the longitudinal center of the tube, which consists in rotating the tube and penetrating its wall by a cut of circular contour extending into and circumferentially of the wall of the tube obliquely both to the axis of rotation of the tube and to its circumferential direction of rotation.

5. The process of cutting the wall of a tube of flexible material, in the contour of a cone substantially concentric with the longitudinal center of the tube, which consists in penetrating the wall of the tube by a cut of circular contour, which extends into the wall of the tube, and also extends circumferentially thereof obliquely across the conical zone of the cut surface, and also turning the cutting edge in the circle described by it.

6. The process of cutting the wall of a tube in the contour of a cone substantially concentric with the longitudinal center of the tube, which consists in penetrating the wall of the tube along the said contour by a cut of curved contour extending obliquely across the conical annulus described by the cut surface, while turning the cutting means in the direction of the curve of the said cut.

7. The process of making acute angled ring gaskets, which consists in separating the gaskets from a tube of gasket material by means of a turning cut penetrating the wall of the tube at an acute angle to its longitudinal center and extending obliquely across and in substantial conformity with the zone of cleavage of the gasket.

8. The process of making acute angled ring gaskets from a tube of gasket material, which consists in rotating the tube upon its longitudinal center as an axis, and cutting the gaskets therefrom by a curved cut extending obliquely both to the said axis and to the circumference of the tube and in substantial conformity with the zone of the cut, while turning the cutting implement substantially in the curve described by its cutting edge.

9. The process of making oblique angled rings, which consists in separating the rings from a tube of material by means of a cutting action extending in a curved contour through the wall of the tube, obliquely both to the center line of the tube and to the circumferential extension of the cut surface, the cutting operation being developed obliquely to the curvature of the tube.

10. The process of making oblique angled rings, which consists in separating the rings from a tube of material by means of a cutting action extending in a curved contour through the wall of the tube, obliquely both to the center line of the tube and to the circumferential extension of the cut surface, the cutting operation progressing circumferentially from the exterior surface to the interior surface of the tube in a curved contour oblique to the line of cut.

In testimony whereof, I have signed my name to this specification in the presence of two subscribing witnesses, this 19th day of March, 1906.

JOSEPH MERRITT.

Witnesses:
 NELLIE PHOENIX,
 CAROLINE M. BRECKLE.